(No Model.)

F. J. SCANLAN.
CABLE GRIP.

No. 497,555. Patented May 16, 1893.

Witnesses:
Alex Barkoff
William D. Conner

Inventor:
Frank J. Scanlan
by his Attorneys
Howson Howson

UNITED STATES PATENT OFFICE.

FRANK J. SCANLAN, OF PHILADELPHIA, PENNSYLVANIA.

CABLE-GRIP.

SPECIFICATION forming part of Letters Patent No. 497,555, dated May 16, 1893.

Application filed February 13, 1893. Serial No. 462,033. (No model.)

*To all whom it may concern:*

Be it known that I, FRANK J. SCANLAN, a citizen of the United States, and a resident of Philadelphia, Pennsylvania, have invented a new Cable-Grip, of which the following is a specification.

The object of my invention is to increase the speed of a car or other moving object, as compared with the speed of the cable by which motion is imparted to the car.

My invention can be applied to all cars, carriages and other traveling bodies which are propelled by a cable, cord, or bar to which longitudinal motion is given.

Figure 1:
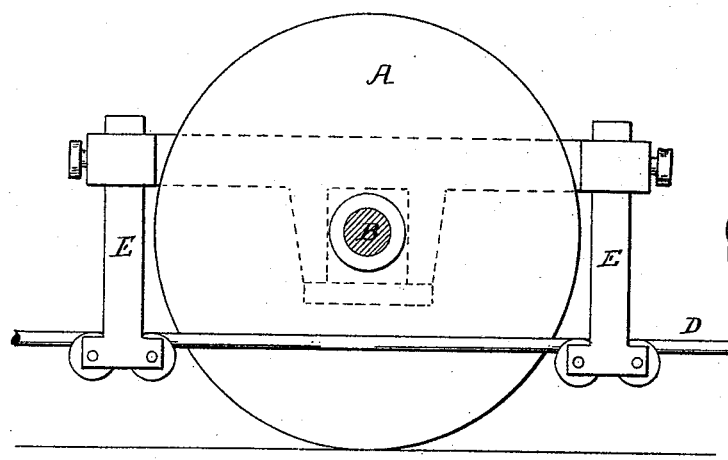
Figure 2:
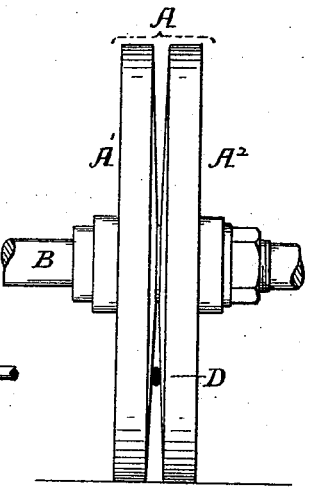
Figure 3:
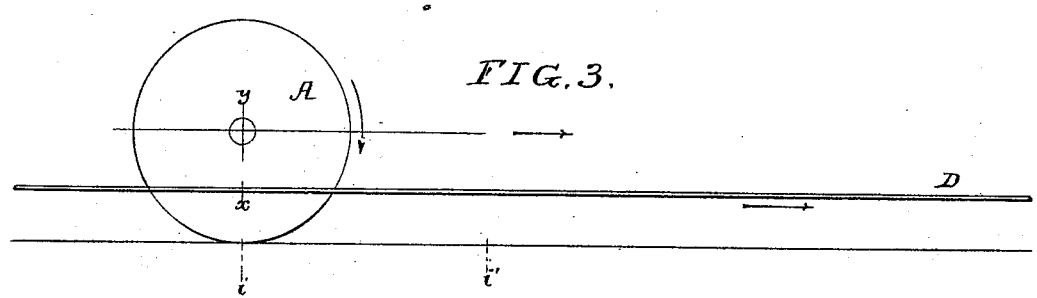
Figure 4:
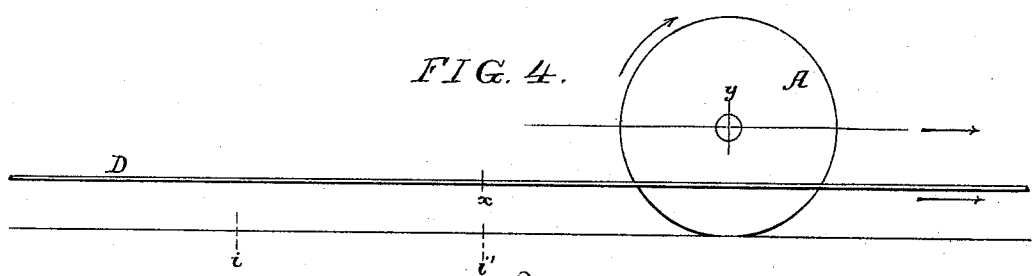

In the accompanying drawings:—Figure 1, is a longitudinal sectional view illustrating my invention. Fig. 2, is a side view of Fig. 1. Figs. 3 and 4, are diagram views illustrating the operation of my invention; and Fig. 5, is a view showing means for moving the disks toward or from each other.

I have omitted from the drawings the details of the carriage, as they form no part of my invention.

A is a wheel made of two parts $A'$, $A^2$. The inner faces of these parts are beveled as shown in Fig. 2, so that when the two parts are together in position on the shaft or axle B they form a tapered annular groove wider at the periphery than at the base. One or both of these sections can be adjusted so as to alter the width of the groove.

Figure 5:
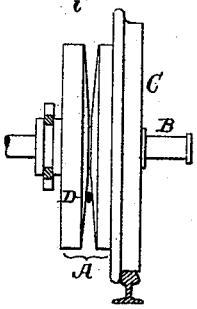

A plain wheel is shown in Figs. 1 and 2, which may rest on a road-bed or a flanged rail, but it will be understood that one of the sections may be secured to a car wheel C as shown in Fig. 5, the wheel taking the bearing, or the wheel A may be mounted on the axle mid-way between the two wheels of the car and the wheels driven through the medium of the axle.

Adapted to the groove in the annular wheel A is the cable D, which may be of metal or a textile rope, and in small devices may be simply a cord, and where the distance to be traveled is limited, a bar may be used, but I prefer to use a rope or metal cable as giving the best results. This cable is suspended by hangers E, E mounted at the front and in the rear of the wheel A as shown in Fig. 1, which hangers can be adjusted vertically so as to suspend the cable upon the proper line within the annular tapered groove.

On drawing the cable through the groove, it will engage with the wheel and be drawn into frictional contact therewith, with force sufficient to move the wheel in the same direction as that in which the cable is traveling, but as the weight of the car is sufficient to prevent the sliding or "skidding" of the wheel upon the track, said wheel will be caused to turn not only upon the track but upon the cable also. Hence the center of the wheel will travel forward at a greater speed than the cable, as the cable is between the center of the wheel and the wheel base.

I have shown in the drawings, the cable situated mid-way between these two points so that the car will travel at a speed twice as great as that of the cable.

Referring to the diagrams Figs. 2 and 3, it will be noticed that if the cable is moved a certain distance, say from $i$ to $i'$, the point of contact $x$ of the cable will move from the line $i$, Fig. 3, to the line $i'$, Fig. 4, and the center point $y$ of the wheel will move from the position shown in Fig. 3, to the position shown in Fig. 4, which is twice the distance traveled by the cable. By moving the point of contact between the cable and the wheel nearer to the center of the wheel, the speed of the car is decreased, while if the point of contact is moved nearer to the wheel base, the speed of the car is increased.

My invention is especially applicable to cable driving devices used either upon elevated or underground roads, or upon ways where a moving cable above the track is not objectionable, and where the travel of the cable is limited to a certain speed. By driving the car from the cable through the medium of the above described device, I am enabled to increase the speed of the car without altering the speed of the cable, and in many instances it may be more economical to drive the cable at a slow speed and to increase the speed of the cars by my improved mechanism, than it would be to drive the cable at the same high speed as the cars.

It will be understood that my invention can be applied to other devices than cars which travel upon horizontal ways or rails, as the invention can be applied to any device where there is a certain amount of friction at the wheel base to prevent slipping, and to insure the turning of the wheel around its axis.

I claim as my invention—

1. The combination of a wheel having a tapered groove with a moving cable adapted to impinge upon the wheel at a point between the periphery of the wheel and its center, whereby frictional contact with the moving cable will rotate said wheel, substantially as described.

2. The combination of a wheel having a tapered annular groove, with a moving cable adapted to said groove, and impinging upon the walls of the same at a point between the center and periphery of the wheel, whereby frictional contact with the moving cable will rotate said wheel, substantially as specified.

3. The combination of a wheel having an annular tapered groove therein, and adapted to travel upon a suitable way or rail, with a cable adapted to the annular tapered groove and impinging upon the wheel and with mechanism for moving said cable, whereby on the movement of the cable the wheel will not only travel upon its ways but also upon the cable, and at a speed greater than said cable, substantially as described.

4. The combination of the wheel having a tapered annular groove, a shaft or axle therefor and a cable, with hangers or supports for the cable arranged at one or both sides of the wheel so as to support the cable within the groove and in contact with the wheel, substantially as described.

5. The combination of the wheel having two sections, one laterally movable in respect to the other, the inner faces of each section being beveled to form a tapered annular groove, with a cable adapted to said groove and impinging upon the wheel, substantially as described.

6. The combination of the wheel having its base in contact with suitable ways, said wheel being made of two sections, one adjustable in respect to the other so as to increase or diminish the space between the sections, with a driven cable adapted to the groove in the wheel, and hangers for said cable, said hangers being vertically adjustable, substantially as described.

In testimony whereof I have signed my name to this specification in the presence of two subscribing witnesses.

FRANK J. SCANLAN.

Witnesses:
HENRY HOWSON,
JOSEPH H. KLEIN.